Dec. 21, 1965    M. G. TALON ETAL    3,224,963
DEHYDRATION OF AQUEOUS SLUDGES
Filed March 28, 1961    2 Sheets-Sheet 1
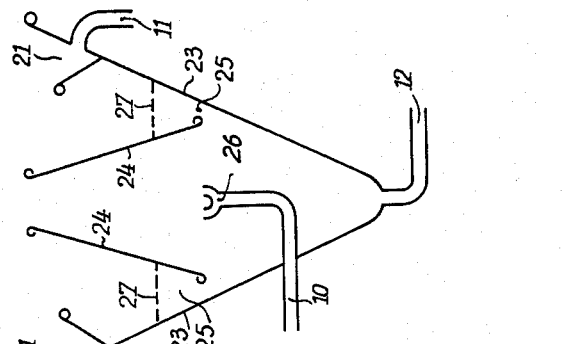
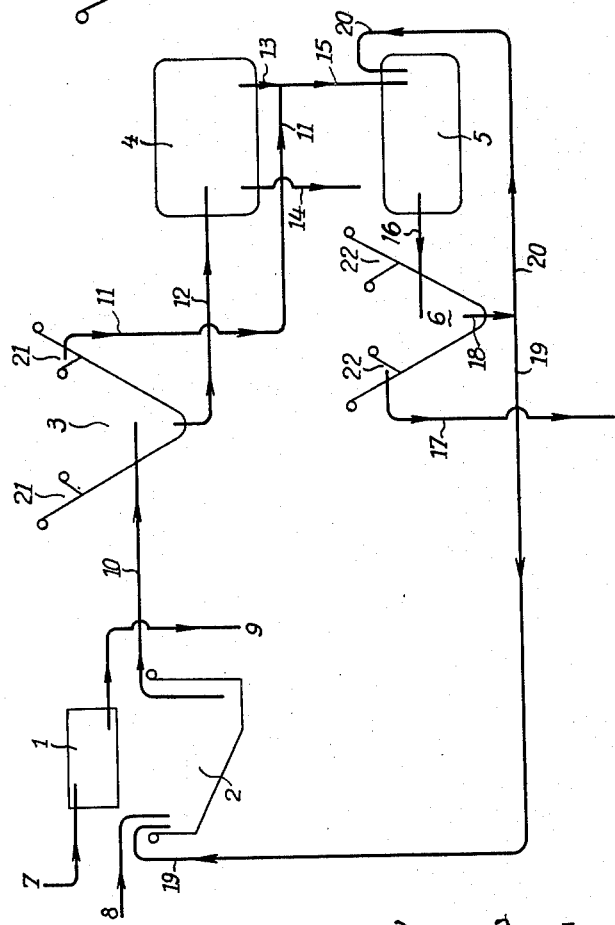

Dec. 21, 1965  M. G. TALON ETAL  3,224,963
DEHYDRATION OF AQUEOUS SLUDGES
Filed March 28, 1961  2 Sheets-Sheet 2
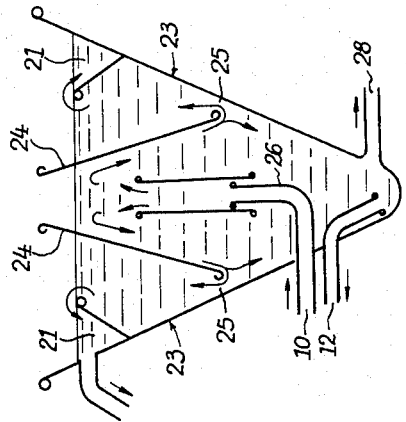
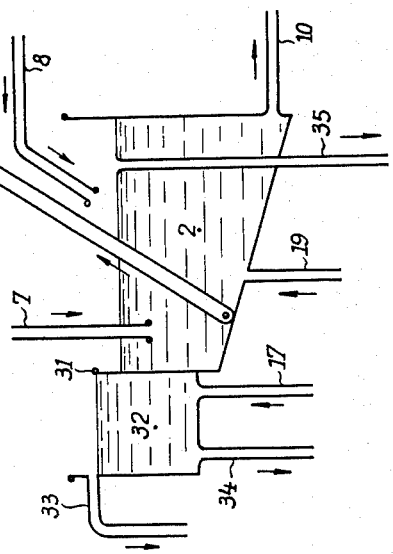

large> United States Patent Office 3,224,963
Patented Dec. 21, 1965

3,224,963
DEHYDRATION OF AQUEOUS SLUDGES
Marcel Georges Talon and Maurice René Stasse, Viroflay, France, assignors to Equipements Techniques Industriels, Somme, France, a company of the French Republic
Filed Mar. 28, 1961, Ser. No. 98,868
Claims priority, application France, Mar. 29, 1960, 822,795; Nov. 14, 1960, 843,826
10 Claims. (Cl. 210—4)

The present invention relates to a new method of treatment of aqueous sludges in order to both recover non-polluted water therefrom and to isolate the constituent materials other than water therein in order either to evacuate them or to recover them for any desired purpose. The term aqueous sludge is intended to include:

(1) A major proportion of water thereby making it impossible or, at least, difficult to handle by simple shovelling;

(2) A collection of substances insoluble in water which, when the sludges are left undisturbed for a sufficient time, are naturally separated therein by gravity and collect in a layer at the bottom of the receptacle containing the undisturbed sludges. In the description which follows, this collection is designated as "the non-floating portion"; and (3) A collection of substances insoluble in water which, when the sludges are left undisturbed for a sufficient time, end by naturally being separated therein, but which, in contrast to the non-floating portion, collect together as a floating layer. The latter collection is designated as "the floating portion" in the following description. However, the formation of the non-floating and floating layer portions automatically purifies the water situated between these layers.

Furthermore, the treatment in accordance with the invention does not make use of the step of allowing sludges to settle, but is characterized by a continuous method of operation which does not comprise at any moment the total or partial settlement of all or part of the constituent substances of the sludges. By contrast, the numerous known treatments of sludges all provide, in at least one of the stages of the treatment, a step which comprises permitting the sludges to remain undisturbed for a pre-determined time and which, consequently, are disadvantageous from the point of view of yield.

In addition of this characteristic feature of continuity of the method of operation, the treatment according to the invention is characterized by the novel combination, of the stages enumerated hereinbelow. Such stages, of course, entail the use of appropriate apparatus, some of which are known or are readily derived from known principles, while others are either novel in themselves or, although known or derived from known principles, are novel through novel conditions of operation.

The stages constituting the method according to the invention are as follows:

(1) A seiving operation to eliminate the large particles from the sludge, whether these are floating or not, such particles being collected to determine whether they will be rejected or recovered. The filtrate resulting from the sieving operations is collected in a reservoir or appropriate receptacle suitably designated as a "primary tank";

(2) A dilution of the filtrate collected in the primary tank with both pure water and with a fluid substance derived from a subsequent stage, wherein the latter fluid substance has acquired at that subsequent stage appropriate physico-chemical properties and/or biological properties.

(3) The transfer by an appropriate means of the diluted filtrate containing both floating and non-floating portions, to a discriminator which is a novel apparatus and which delivers two fluid substances essentially discriminated, one comprising water and the floating portion and the other comprising water and the non-floating portion;

(4) The simultaneous transfer, both of the aqueous fluid substance containing the floating portion to a precipitation and decantation device, and the aqueous fluid substance containing only the non-floating portion to a separator. The separator separates the latter fluid material into an aqueous magma having a consistency such that it can then be handled by simple shovelling and collected in an appropriate means with a view to its rejection or retention, and to an aqueous filtrate which is sent into the precipitation and decantation device at the same time as is the aqueous fluid material which contains the floating portion;

(5) The stay, due to the slow continuous circulation of the fluid material containing a mixture of the floating portion and the aqueous filtrate, in the precipitation and decantation device for a pre-determined period having a duration, such that the phenomena of precipitation and decantation have sufficient time to take place with a satisfactory efficiency, the latter phenomena terminating first in a yield of purified water and secondly in the production of an aqueous precipitate which has acquired appropriate physico-chemical properties, and in some cases biological properties during the course of its formation. The smaller portion of the precipitate is then directed into the primary tank as set farther hereinabove, in which it is mixed with the first filtrate while the major portion of the precipitate is fed into the upstream side of the precipitation and decantation device, the latter device thus operating simultaneously in a continuous closed loop cycle, the cycle including the preceding stages starting from the primary tank, and as a continuous delivery device for pure water, the purified water being discharged into an appropriate means.

The principle of the relative successive and cyclic combination of the above stages will be described in detail hereinbefore, reference being made to the accompanying diagrammatic drawing. Prior to such description it is to be noted that the inventive concept consisting of the simultaneous bio-chemical precipitation of the conveyed floating portion and the impurities existing in the filtrate by means of micro-organisms specially selected for that purpose, is intimately boundup with the inventive concept of the cyclic circulation described above.

The validity of these inventive concepts have been confirmed by appropriate tests. Such validity has been very clearly confirmed both at the laboratory stage, and since the invention had for its object the establishment of an industrial process, also by further tests on a scale which are at least semi-industrial.

The results of these latter tests have pointed out the importance of certain conditions in the application of the invention on an industrial scale, and their effect on the means employed in order for these conditions to be met, these means constituting essential features of the invention. These means are effected in the following manner:

(1) A particular arrangement of the first reservoir, i.e. as the "primary tank" and a particular method of feeding this tank;

(2) A particular shape and size of an intermediate tank which suitably designated as a "washer-discriminator" in the description following; and (3) A particular method of use of the micro-organisms.

With regard to method (3), it is to be noted that heretofore among the various known methods of dehydration of aqueous sludges, the method which has generally been considered the best has consisted of a treatment in three successive phases, viz:

(1) A purely mechanical treatment terminating in the separation of a mainly solid portion which is evacuated by means appropriate to its high degree of moisture, and a mainly liquid portion or so-called "evacuation liquid";

(2) A purely chemical treatment of the evacuation liquid in order to facilitate the precipitation of the particulate materials remaining suspension in this liquid; and (3) A purely mechanical purification of the chemically-treated evacuation liquid.

However, the problem of the strict purification of the water separated in the third phase has not in any way been resolved.

With regard to the method according to the invention, apart from the ordinary purifications by mechanical means, there is essentially a total absence of any chemical treatment, this chemical treatment being replaced by a biological treatment giving rise to mainly biophysical reactions by means of the use in such biological treatment, of an appropriate fauna of micro-organisms. The object of the biological treatment is to achieve not only the effect produced by known previous chemical treatments, but also the definite destruction of all pollution in the aqueous end product of the whole of the operation, the operation terminating first in the production of a magma, the moisture content of which is reduced to a degree which makes it capable of easy handling, and secondly in the production of pure water by virtue of the combination which is characteristic of the method according to the invention, there results absolute material purification and de-pollution, in conformity with the instructions of the Conseil Supérieur d'Hygiene Publique de France.

It is known with regard to biological reactions, the conditions of the medium have a major influence on the efficiency thereof, and that the establishment of the optimum conditions of the medium influences the design and the arrangement of the means, both material, and physical or mechanical, which are to be employed, not only during the reactions but also before and after the reactions.

With regard to the means to be employed in the case of de-hydration of sludges, it is also known that these means comprise conventional equipments which operate dynamically, such as lifting screens, centrifugal machines, filter-presses, vacuum-filters, etc., and apparatus which operate statically, such as tanks or drying beds, sewage beds, the latter in the case of town sewage, necessitating a very large surface area on the order of many acres.

Tests carried out on a semi-industrial scale have shown in a conclusive manner that the means to be employed for the final purification of the water can be reduced in bulk to a very considerable extent in the case of the method according to the invention, and can be brought down to a bulk which does not exceed about one twentieth of the means previously employed.

If, in addition to this, the experimental results are considered in connection with the effective de-hydration obtained on a semi-industrial scale, as shown in the tabulation which follows:

| Data | Before treatment | After treatment | |
|---|---|---|---|
| | | By vacuum filter | By the method according to the invention |
| Water content of intake sludges. | 90% | 75% | 70%. |
| Volume of sludge | 25 cu. m | 10 cu. m | 10 cu. m. with an expansion of the sludge. |
| Appearance | Liquid | Pasty | Solid, having a plasticity similar to that of clay. |
| Biological adsorption of oxygen in 5 days ($DBO_5$). | 3,000 mg. per litre of water. | 400 mg. per litre of water. | 50 to 80 mg. per litre of water. |

It can be stated without any exaggeration that the method in accordance with the invention effects a marked improvement on an industrial scale.

This having been explained, the invention will now be described with reference to the accompanying diagrammatic drawings, in which:

FIG. 1 is a general diagram in which the respective equipments corresponding to each stage have been shown in a symbolic manner.

FIG. 2 is a diagrammatic representation showing the principle of one of the stage equipments, which is of completely new design, and the inclusion of which in the chain of stages is an essential feature of the method according to the invention.

FIG. 3 shows the principles of the arrangement and the supply of the primary tank with a view to the industrial application of the method in accordance with the invention.

FIG. 4 shows diagrammatically the shape and layout of the washer-discriminator shown in principle in FIG. 2, for the industrial application of the method of the invention.

In these four diagrammatic drawings, the same numbered references have been given to the various corresponding parts, equipments and conduit systems.

In FIG. 1, there is shown at 1 the sieve or screen intended to eliminate the large material; the aqueous sludge to be filtered arrives through the conduit 7 and the large materials are evacuated through the piping system 9; the aqueous filtrate falls into the primary tank 2 which, in addition to the filtrate, receives dilution water supplied through the piping system 8 so as to give the filtrate an appropriate degree of fluidity for the subsequent operations. The diluted filtrate is taken off by the conduit 10 which sends it into the discriminator 3, this being an apparatus of entirely new design shown diagrammatically in FIG. 2, in connection with which further explanation will be given below.

This apparatus 3 separates the diluted filtrate into two aqueous fluids, one fluid carrying the floating portion and overflowing into the annular gutter 21, from which it is drawn by the piping system 11, terminating in the precipitation and decantation device 5, through the intermediary of the pipe 15, the other fluid conveying the non-floating portion flowing naturally toward the bottom of the discriminator 3 from which it is taken by the piping 12 to be conveyed to the separator 4.

The separator 4 may be of any appropriate known type capable of working in a continuous manner without risk of choking, such as for example a centrifuge. From this separator, the aqueous magma referred to above passes out through the piping system 14 and the aqueous filtrate through the piping 13, the latter being also conveyed to the precipitation and decantation device 5 through the piping system 15.

The aqueous fluid carrying the floating portion brought in by the piping 11 and the above filtrate brought in by the pipe 13 mix in the conduit 15 and pass simultaneously into the precipitation and decantation device 5. In fact, this precipitation and decantation device is constituted by the two parts with reference numbers 5 and 6, the portion 5 representing the part in which the formation of the precipitate takes place, while the part 6 represents the portion in which the precipitate is collected, while the water, purified as a result of the precipitation, overflows and is collected by an appropriate means. The two parts 5 and 6 are coupled symbolically by the conduit 16.

The portion 5 is arranged in accordance with the known general principles following which micro-organisms are caused to act on a circulating aqueous material for a suitable retention time and under the physical conditions required to maintain them in life and activity, with the object of obtaining perfectly purified water at the outlet. However, according to the invention, the micro-organisms employed do not fall within the categories which are normally used for the conventional aerobic and anerobic fermentations. The biological phenomenon initiated according to the invention in this portion 5 is entirely different but this fact does not by itself exclude the possibility, by means of certain modifications, of utilizing in the method of the invention the activation and decantation constructions built for other purposes.

The micro-organisms utilized are in effect selected from appropriate families and origins for the initiation of biochemical reactions which cause:

(1) The absolute precipitation of the whole of the substances other than water introduced into portion 5;

(2) The imparting to this precipitate of coagulating physico-chemical properties, and (3) The constitution of this precipitate as a vehicle for carrying the micro-organisms and capable by this means of transmitting for a distance the specific action of these micro-organisms, in addition to its coagulating properties.

The reasons and objects corresponding to the above desiderata will be explained below.

It is to be noted that portion 6 is arranged in a conventional manner so that the particles formed during the course of the precipitation reactions taking place in the portion 5 collect together naturally in their movement toward the bottom of portion 6, and are taken-off by the piping system 18, whereas the water which is then perfectly purified overflows into the annular gutter 22 from which it is evacuated through the piping system 17. With regard to the precipitate passing out through the conduit 18, this is unequally divided between the two conduits 19 and 20. A major portion of the precipitate is conveyed through the conduit 20 to the upstream side of the portion 5, thus creating with respect to the precipitation and decantation device 5–6, the closed cycle as previously hereinabove mentioned, such cycle initiating a continuous bio-chemical action which is perfectly controlled and stabilized, whereas a smaller quantity of the precipitate is sent through the piping system 19 into the primary tank 2 and thereby, by virtue of its coagulating property acquired in the portion 5, this smaller quantity facilitates the discrimination in the discriminator 3. This conveyance through the piping 19 constitutes the closure of the second cycle previously referred to, including the stages preceding the precipitation. With regard to the ratio between the larger and smaller quantities, it is clear that this can only be determined as a function of each particular case of application, but it is to be understood that the invention includes all the proportions whatever their magnitude and the extent of the margins of magnitude indicated as being preferable in any particular case of application of the invention.

In the diagram of FIG. 1, the direction of circulation has only been indicated by arrows drawn on the conduit systems themselves without any representation concerning the means for effecting circulation or for regulating the rates of flow. Such depiction has been shown to point out that the invention is completely independent of both the choice and also of the nature of these means, such choice and nature being essentially determined by the particular case of application of the invention, which is in turn a function of the nature of the sludges to be treated and also of the dimensions and the spacial arrangement of the various stage equipments included in the complete installation. These means can individually be of any appropriate type such as: cocks, valves, descent by gravity, air ejector, pump, etc., with or without automatic drive and controlled as may be required in dependence on a particular physical quantity, such as for example a level in one of the equipments, a local rate of flow, a degree of fluidity, a content of a particular substance, i.e., mineral, organic or biological, etc.

With regard to the concentration and the nature of the micro-organisms set into operation in the precipitation and decantation device 5–6, the invention contemplates the use separately or in simultaneous or successive combinations, of the micro-organisms belonging, among others, to the following families and origins or micro-organisms derived therefrom: Mesosaprobia $\alpha$, mesosaprobia $\beta$, sapropel of R. Lantertorn.

It is to be understood that the term "precipitation" employed in this application is used in its general sense, i.e. including such phenomena as pure precipitation, coagulation, destruction of surface tensions or of unfavorable physico-chemical conditions acting in opposition to useful phenomena such a adsorption, chemical or biochemical reactions, and defining as a final result an absolute particulate precipitation of everything which is not water.

With regards to the discriminator in FIG. 1, more fully shown diagrammatically in FIG. 2, the invention formally claims the principles of the essential introduction of this stage, and also the construction of the corresponding equipment. As illustrated in FIGS. 1 and 2 the discriminator comprises a conical tank 23, the flared portion of which is directed upwardly and is provided with the annular gutter 21 which is associated with the conduit 11. In the interior of tank 23 and approximately in its upper half there is provided a conical partition 24, the flared portion of which is directed downwardly leaving a free annular space 25 between the partition 24 and the tank 23, and the narrowest portion of which is at 24' in communication with free air.

The aqueous diluted filtrate containing the floating and the non-floating portions arrives through the conduit system 10 which terminates in an axial injector 26 directed upwardly and discharges approximately level with the flared portion of the conical partition 24. This method of injection generates a turbulence in the interior of the partition 24 and the diluted filtrate thus ejected is forced to pass through the annular space 25. According to the invention, the relative dimensions and conical angles of the tank and the partition are chosen in relation to the degree of dilution and the rate of flow of the filtrate thus injected, and by means of an appropriate choice of these quantities, there is obtained a spontaneous collection of non-floating particles in the bottom of the tank 23, the stable formation of the annular zone of a screen 27 constituted by those of the particles of the non-floating portion which are the finest. The screen remains permeable to the floating portion by reason of the fineness of the particles of which it is formed, and permits this floating portion to reach the annular gutter 21 after it has passed through the screen 27.

This phenomenon of the formation of a permeable screen is essential in order to obtain the desired discrimination of the diluted filtrate into two aqueous fluids, one conveying the non-floating portion and passing out through the piping system 12, and the other conveying the floating portion and being evacuated through the piping system 11.

The reasons for this discrimination are as follows:

The separation of water from the other substances contained in an aqeous sludge is obviously boundup with an operation currently known as "filtration," but the tendency to choking in the case of the use of a mesh filter makes it necessary to employ separation by centrifugal action and for the added reason that, as explained hereinabove, it is desired to operate continuously. However, even with this latter method of operation, the presence in the sludge of certain substances such as for example oily substances of those having a colloidal structure interferes with or immobilizes the separation in question.

These substances have generally a specific weight very close to that of water, and practically the whole of that which is herein termed "the floating portion" is constituted by such substances. It is therefore essential that the unfavorable action of the floating portion on the separating centrifuging of the non-floating portion be eliminated prior to this centrifuging operation.

It will readily be understood that the essential inventive concept of the method according to the invention consists in the separation of the non-floating portion from the presence of the floating portion by means of the interposition of the discrimination stage and in the corresponding provision, prior to this discrimination, of a dilution of the aqueous filtrate so as to obtain aqueous vehicles which circulate readily either before or after the discrimination stage. The dilution water is not lost and will be recovered at the outlet of the last stage, mixed with the water initially present in the sludge, the whole being perfectly purified.

The following table will show still more clearly the fundamental concept of the invention.

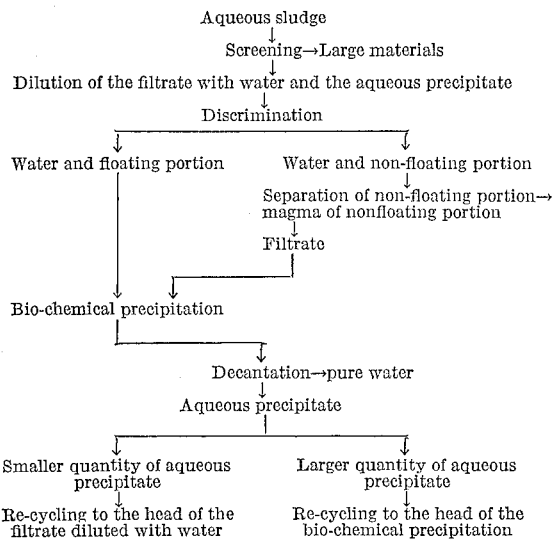

*Arrangement of the primary tank for industrial scale working.*—This arrangement is shown in FIG. 3. The primary tank 2 of FIG. 1 is divided into two tanks separated by an overflow sill 31, the left-hand tank 32 in the figure being known as the washing tank and the other having the reference 2 and which for convenience is still designated as the primary tank. This primary tank contains a mechanical screen 1 arranged so as to evacuate automatically into the discharge 9 the large materials present in the sludges to be de-hydrated, arriving there through the conduit system 7, the screen being self-cleaning.

The portion of the primary tank 2 located below the mechanical screen 1 will therefore receive:
 (a) the filtered sludges,
 (b) a mixture comprising:

Through the intermediary of the washing tank 32 and the overflow sill 31, the dilution and washing water obtained from the final decanter (reference No. 6 of FIG. 1) re-cycled and arriving through the conduit 17;
The sludges in excess coming from the final decanter referred to above and arriving through the conduit 19;
When so required, water supplied from a distribution system and arriving directly into the primary tank through the conduit 8.

The overflow sill 31 which separates the washing tank 32 from the primary tank 2 is an adjustable sill having the form of a V. In addition, the washing tank 32 is provided with an overflow 33 and a drainage system 34. The primary tank 2 is also provided with an overflow 35. These three conduit systems 33, 34 and 35 terminate at a collector tank (not shown) from which the liquid is then directed for example to a water-treatment installation.

By way of example of the construction on an industrial scale, without any implied limitation, the primary tank 2 may have a capacity of the order of two cubic metres. Although this feature has not been shown in the diagram of FIG. 3, it is obvious that in an industrial installation, the walls of the primary tank 2 would be sloping (at about 45° for example) in order to prevent any deposits. The volume of the excess sludges passing into the primary tank 2 through the conduit 19 may be of the order of three cubic metres, and the rate of flow of the washing water arriving at the washing tank 31 from the final decanter (reference No. 6 in FIG. 1) through the conduit 17 is then of the order of twelve cubic metres per hour approximately. When so required, if the flow of this water becomes insufficient, it may be completed by water from the supply mains arriving directly into the primary tank 2 through the piping system 8.

It will be observed that the means of taking water and sludge from the two tanks referred to above are independent of the invention, and that use may be made of any conventional industrial means having a size, capacity and power appropriate to the movements to be ensured.

Whatever these extraction means may be, it follows from the figures given above that the order of magnitude of the capacity of the primary tank 2 should correspond in a substantially equal manner to the order of magnitude of the volume of the excess sludges which are sent to it, and that the suitable overall hourly volume of washing water, from whatever source it is derived, may be of the order of 5 to 6 times that of the primary tank or of the excess sludges.

It should however be observed that the figures indicated above are only really valid for the aqueous sludges which have been used in testing the method on a semi-industrial scale and that for sludges having a different particulate and aqueous composition, these values may necessarily be different, it being understood that this involves no departure from the scope of the invention. Furthermore, the possible influence of a variation in the aqueous content can obviously be readily compensated, in the case of insufficiency, by a previous addition of water in appropriate quantities.

*Form and dimensions of the washer-discriminator on an industrial scale* (see FIG. 4).—In the drawing of FIG. 4, there are included all of the parts shown in FIG. 2, with the addition of a drainage pipe 28. In order to be able to define the dimensioned arrangement of the washer-discriminator in correspondence with the figure, it is first necessary to explain the problem which this arrangement resolves.

It has been stated hereinbefore that the method according to the invention is characterized by the separation of the aqueous sludge into two distinct aqueous fluids, one conveying the floating substances and the other the non-floating substances. In addition, in the description of FIGS. 1 and 2, the principles of construction of the washer-discriminator were explained.

It will be observed that according to FIGS. 1, 2 and 4, this washer-discriminator apparatus, has a form generally similar to the decantation apparatus shown at 6 in FIG. 1, and that with reference to such decantation apparatus no explanation has been given as to the principle of its construction.

This is because such decantation apparatus is a currently known device utilized in certain industries for decantation to its bottom of decantable particles conveyed by a liquid. In the case in which the conveyed particles are floating particles such as for example particles of fibrous materials or of pulps of vegetable origin, there is incorporated in these apparatus a reversed axial frusto-conical deflector, open at its two extremities, similar to the deflector shown at 24 in FIGS. 2 and 4.

By virtue of the annular turbulence and the variations of local speed of the liquid which, arriving axially, is compelled to pass through the annular restricted passage 25 in order to pass upwards and overflow from the annular overflow 21, the floating particles are carried away and accumulate at the upper surface of the liquid circulating in the apparatus, from which they may be collected for any desired purpose.

The problem solved by the method according to the invention is quite different. In this case, there is in fact present a liquid which simultaneously conveys decantable particles and floating particles and furthermore these floating particles resist any agglomeration because of their colloidal nature. It is also known in this connection that water-absorbent colloids combine with intermicellar water (phenomenon of solvation) and that the layers of condensed water around the micella contribute to the stability of the colloid by preventing the adhesion of the particles to each other in the same way as an elastic membrane, and that there exist basic laws known as "Stokes law" and "Van der Waals law" concerning the separation of colloids from an aqueous vehicle.

But here also, these laws only concern the case of an aqueous vehicle conveying micella which are solely colloidal, and the definition of the relative dimensions of the apparatus intended to separate the colloidal particles from the other particles should take into account simultaneously, in the method according to the invention, of the requirements of both kinds of particles, one kind being colloidal and floating and the others non-colloidal and non-floating, to be collected by decantation towards the bottom of the apparatus.

The tests carried out on a semi-industrial scale for a rate of intake flow of aqueous sludges containing these two kinds of particles have made it possible to define the relative dimensions to be given to the constituent parts of the washer-discriminator, the operation of which is based on the establishment of a filtering screen (reference 27 in FIG. 2) capable of working effectively on an industrial scale.

For an hourly input flow of an industrial order (represented by the letter $Q$) of a liquid conveying colloidal and non-colloidal particles, the useful surface of the apparatus (represented by the letter $S$) given in square metres, should be roughly of the same order as the rate of input flow $Q$ measured in cubic metres per hour, and the hourly volume of extraction from the bottom of the apparatus of liquid conveying the non-colloidal particles should be substantially of the same order as about one-third of the hourly rate of input flow. There is thus obtained a surface load of the order of $3/S$, expressed in cubic metres per square metre per hour.

By suitably choosing the surface area $S$, it is thus possible to ensure the transport of particles having a diameter less than 0.05 mm.

With regard to the restricted annular space 25 (the useful surface of which is represented by the letter $E$), it is necessary to try to establish and maintain in the vicinity and above this narrow space, a horizontal screen constituted by non-colloidal particles having an automatically selected diametric size of such fineness that this screen constitutes a kind of filter which is permeable to all of the colloidal particles.

The local instantaneous speed of upward movement of the streams of liquid, which decreases as a function of the relation between the respective degrees of conicity of the casing of the apparatus and the deflector, should therefore be such that these non-colloidal particles of small diametric size are only carried away by the liquid to a very small height and in addition, that the diameter of these entrained particles does not exceed a size which adversely affects the permeability of the screen thus formed, with respect to the floating colloidal particles.

It has been found by experiment that this diameter should be as a maximum on the order of 0.10 to 0.15 mm. This size defines the surface load in cubic metres per square metre per hour which, based on a rate of upward flow of liquid of the order of $2Q/3$ makes it necessary to provide a useful surface $E$ for the annular restricted space expressed in square metres, of the order of $2Q/9$ expressed in cubic metres.

With regard to the useful surface of the lower opening of the frusto-conical axial deflector (surface represented by the letter $D$) it is necessary to provide for this surface $D$, as a function of the quantity of liquid which does not pass up to the top of the apparatus and which is taken off from the bottom of the apparatus, i.e. about one-third of the total flow $Q$, a surface load such that the non-floating particles the size of which is definitely greater than the limiting size of the particles utilizable for the constitution of the screen, are readily carried away to the bottom of the apparatus.

By estimating from experimental data the average size of these particles as 0.25 mm. in diameter, it can be deduced that the surface load above should have on the average a value expressed in cu.m./sq.m./hour, the magnitude of which is on the order of about $2Q/3$, which means that the useful surface $D$ expressed in square metres should be given a value of the same order.

The tests undertaken for the above purposes have fully confirmed the validity of the deductions made above concerning the formation of the horizontal filtering screen between the deflector and the casing of the apparatus, the rising separation of the whole of the colloidal particles in the form of a milky suspension, and the easy downward progress of the non-colloidal particles, the diametric size of which exceeds the size selected for the formation of the filtering screen.

*Method of use of the micro-organisms.*—It has been stated above that the aqueous fluid passing out of the washer-discriminator apparatus conveying the floating substances, is subjected to a bio-chemical precipitation including absolutely the whole of the substances other than water present in the fluid.

In this connection, it should first be observed that the term "bio-chemical" employed is a term in general use in biological reactions and that in fact in the method according to the invention there is a superposition and combination of reactions which are effectively bio-chemical, but also of reactions which are bio-physical, since there is a modification of the surface condition of the non-decantable particles, which modification converts these particles to a decantable state. Concluding from the experiments which were made, it can further be said that the bio-physical reactions are predominant.

But these experiments have emphasized the importance of an unexpected phenomenon which not only affects the value of the efficiency of the method according to the invention, but in addition is of general use and can be applied in any installation for treatment of used water, either existing or of a known type, for making use at any stage of the action of micro-organisms, with a view to obtaining a considerable increase in yield. This phenomenon consists of the definitely stimulating action with respect to the precipitation of substances other than water, of a partial cycling taking place over the whole or a part of the course of de-hydration, of solid or liquid materials passing out of a cell or of an assembly of cells, in which the aqueous sludges are subjected to the action of micro-organisms by the term "micro-organisms" there are included not only species selected a priori in dependence on the composition of the aqueous sludges to be treated, such as the organisms previously mentioned by way of indication, but also conventional aerobic and anaerobic organisms. Furthermore, it has been found that by reason of this cycling, the organisms put into use multiply and give rise to acclimatized varieties resulting necessarily in a natural autoselection, thereby eliminating the produced organisms of least resistance and leaving to subsist only the organisms having a resistance at least equal to and even excluding that of the original stocks.

There results from these duly-estabilshed phenomena that:

With regard to the method according to the invention, the charge expressed in cu.m./sq.m./hour of aqueous sludges subjected to activation by micro-organisms can be substantially increased with a parallel increase in yield and that:

Concerning any other method of treatment in which there has been provided following the conventional manner, a combined aerobic and anaerobic action, the yield of the installation can also be definitely increased.

The cycling of the action of the micro-organisms on sludges is therefore, irrespective of the more or less great extent of the cycling circuit, i.e., from the short-circuit up to the complete inclusion of the course, a means capable of general application to any installation for treatment of used water which makes use in a conventional or non-conventional manner of the action of micro-organisms, and by reason of that application is capable of increasing the yield.

The partial cycling which has just been described constitutes therefore not only a characteristic feature of the method according to the invention but in addition it constitutes an independent feature applicable to any method other than that of the invention which comprises an action of micro-organisms at any of its stages.

Finally, it will be understood that all of figured or other indications which have been given in the present invention have only been given by way of example to prove the material nature of the invention and that they cannot in any case be interpreted as constituting a limitation of the scope of the invention.

What is claimed is:

1. The method for the treatment of sludges to recover non-polluted water and to isolate constituent material therefrom, said method comprising the steps of
   (a) filtering the sludge to separate coarse material from a resulting first filtrate containing floatable and non-floatable material,
   (b) separating said first filtrate into two distinct aqueous fluids, one of said fluids conveying said floatable material, the other of said fluids conveying said non-floatable material,
   (c) separating the magma from said non-floatable material fluid to obtain an aqueous second filtrate,
   (d) reuniting said aqueous second filtrate with the floatable material fluid into a common flow,
   (e) and subjecting said common flow to biochemical precipitation by the action of micro-organism, thereby obtaining non-polluted water and an aqueous precipitate.

2. The method according to claim 1 wherein said aqueous precipitate is recycled.

3. The method according to claim 1 wherein said micro-organisms are selected from the group consisting of mesosaprobia $\alpha$, mesosaprobia $\beta$ and sapropel of R. Lantertorn.

4. The method according to claim 1 wherein said aqueous precipitate is divided into a larger portion and a smaller portion, said larger portion being united with said aqueous second filtrate prior to said biochemical precipitation and said smaller portion being united with said first filtrate.

5. An apparatus for the treatment of sludge for recovering non-polluted water and magma therefrom comprising in combination
   (a) sieving means for the sludge to separate coarse material from a resulting first filtrate containing floatable and non-floatable substance,
   (b) a first tank receiving said first filtrate,
   (c) a discriminator receiving said filtrate from said tank and separating said first filtrate into two distinct aqueous fluids, one of said fluids containing said floatable substances, the other of said fluids containing said non-floatable substance,
   (d) a separator receiving said non-floatable substances fluid from said discriminator and separating the magma from the remaining aqueous filtrate,
   (e) a first conduit system carrying off the floatable substances fluid from said discriminator and a second conduit system carrying off the aqueous filtrate from said separator, said first and second conduit systems merging into a common conduit system,
   (f) an installation to effect biochemical precipitation, said installation being fed by said common conduit system and delivering non-polluted water and a remaining aqueous percipitate.

6. An apparatus according to claim 5 wherein said discriminator comprises
   (a) a funnel shaped vat,
   (b) a circular channel within said vat near its top opening,
   (c) a further open frusto conical partition in reversed position within said vat to have its lesser diameter opening as its upper opening and its greater diameter opening as it lower and wider opening, said partition forming an annular space with the inner surface of the vat to define a smaller upper opening located between the wall of the discriminator and said further conical partition, said space communicating with the space within the vat,
   (d) a first conduit feeding said first filtrate into said vat and terminating at least near the inner space of the said partition,
   (e) an injector at the end of said first conduit,
   (f) and a second conduit carrying off floatable material assembled in said circular channel.

7. An apparatus according to claim 5, wherein the operative surface of said discriminator expressed in square meters has a value of substantially the same order as the flow of fluid, expressed in cubic meters, to be treated in the discriminator.

8. An apparatus according to claim 5 wherein the hourly volume of fluid taken from the discriminator is about one third of the hourly input flow of fluid entering the discriminator.

9. An apparatus according to claim 6 wherein the smaller upper opening located between the wall of the discriminator and said further conical partition, expressed in square meters, has a value expressed in cubic meters of about two ninths of the hourly flow of fluid entering the discriminator.

10. An apparatus according to claim 6 wherein the lower and wider opening of said further conical partition, expressed in square meters, has a value, expressed in cubic meters, of about two thirds of the hourly flow of fluid entering the discriminator.

References Cited by the Examiner

UNITED STATES PATENTS

| 1,999,973 | 4/1935 | Center et al. | 210—10 X |
| 2,246,224 | 6/1941 | Streander | 210—221 X |
| 2,963,430 | 12/1960 | Schreiber | 210—4 |

OTHER REFERENCES

"The Sludge Blanket Clarifier," Prager, Water and Sewage Works, vol. 97, April 1950, pp. 143–153.

MORRIS O. WOLK, *Primary Examiner.*

CARL F. KRAFT, *Examiner.*